United States Patent [19]

Matherat

[11] 4,297,694

[45] Oct. 27, 1981

[54] SYMBOL GENERATOR FOR A GRAPHIC CONSOLE

[75] Inventor: Philippe Matherat, Paris, France

[73] Assignee: Thomson-CSF, Paris, France

[21] Appl. No.: 39,260

[22] Filed: May 16, 1979

[30] Foreign Application Priority Data

May 18, 1978 [FR] France ................ 78 14765

[51] Int. Cl.³ ................ G06F 3/153

[52] U.S. Cl. ................ 340/750; 340/731; 340/748

[58] Field of Search ................ 340/750, 748, 756, 758, 340/771, 752, 731

[56] References Cited

U.S. PATENT DOCUMENTS

| | | | |
|---|---|---|---|
| 3,786,478 | 1/1974 | King | 340/750 X |
| 3,893,100 | 7/1975 | Stein | 340/731 |
| 4,090,188 | 5/1978 | Suga | 340/731 |
| 4,107,662 | 8/1978 | Endo et al. | 340/731 |
| 4,107,786 | 8/1978 | Masaki et al. | 340/731 X |
| 4,129,860 | 12/1978 | Yonezawa et al. | 340/731 |

OTHER PUBLICATIONS

Carter & Mrazek; "There's a Better Way to Design a Character Generator", *Electronics*, Apr. 27, 1970, pp. 107–112.

*Primary Examiner*—David L. Trafton
*Attorney, Agent, or Firm*—Roland Plottel

[57] ABSTRACT

A symbol generator for drawing alphanumeric characters and simple geometric figures by a dot method. According to the invention, the format and the size of the symbols may be modified.

The generator 60 operates under the control of a data bus MPDB and includes: a writing unit 61 comprising counters 62 and 63 and a logic writing means 64; a read-only character memory (ROM) 65 and a writing pointer 66 comprising two registers 67 and 68.

A symbol generator according to the invention may be used in the field of graphic terminals and printers.

18 Claims, 21 Drawing Figures

Figure 3:
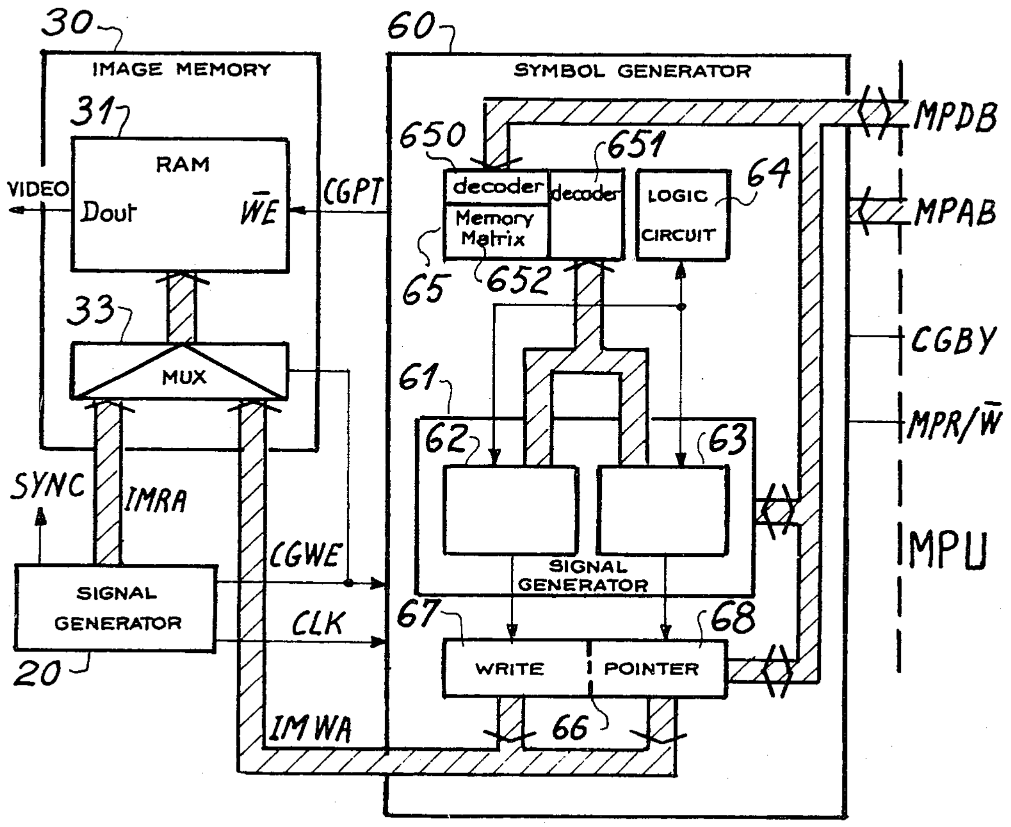

Fig. 1
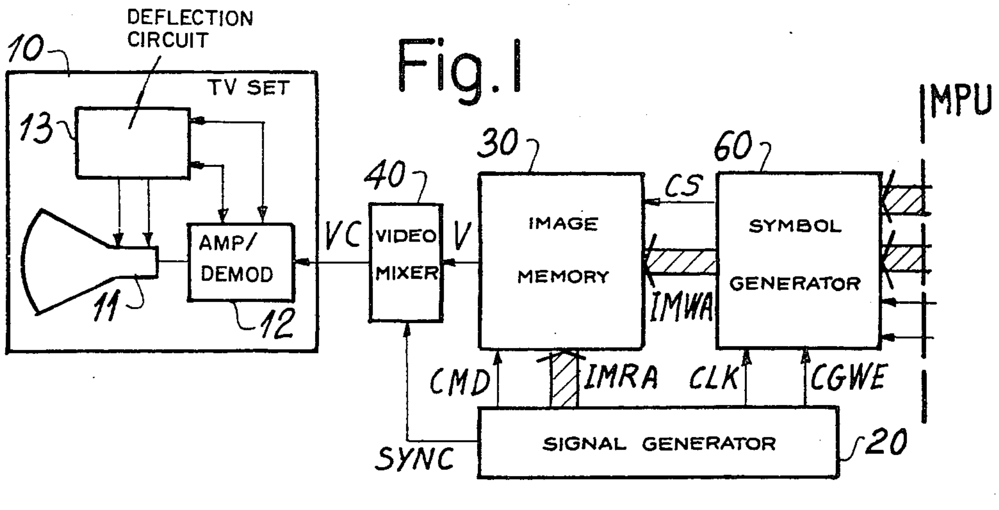
Fig. 2a
Fig. 2b
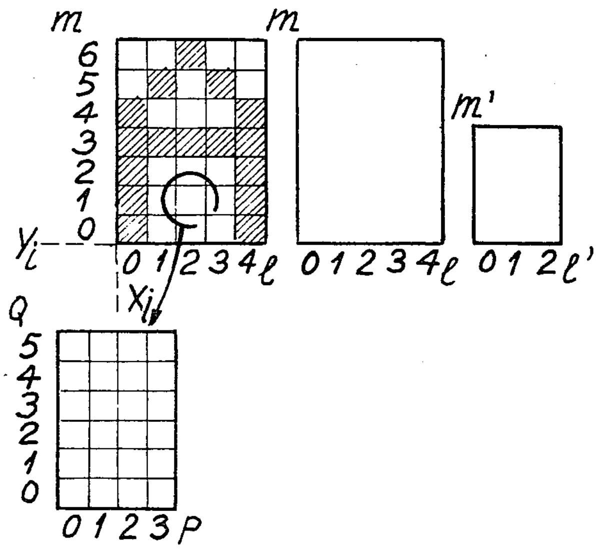
Fig. 2c
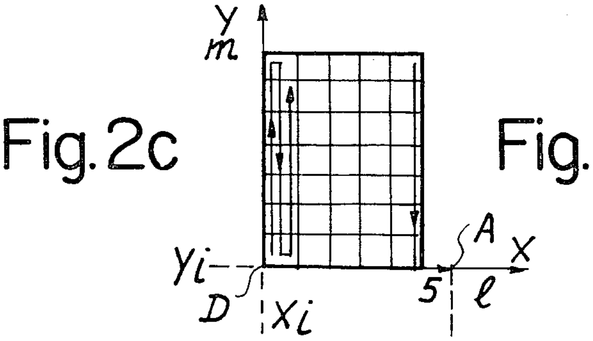
Fig. 2d
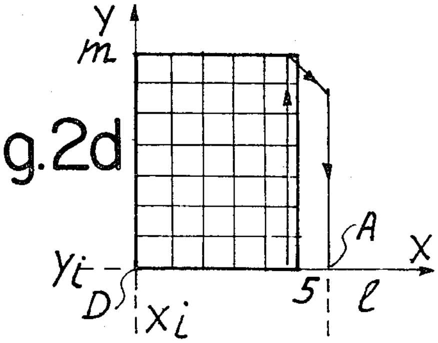

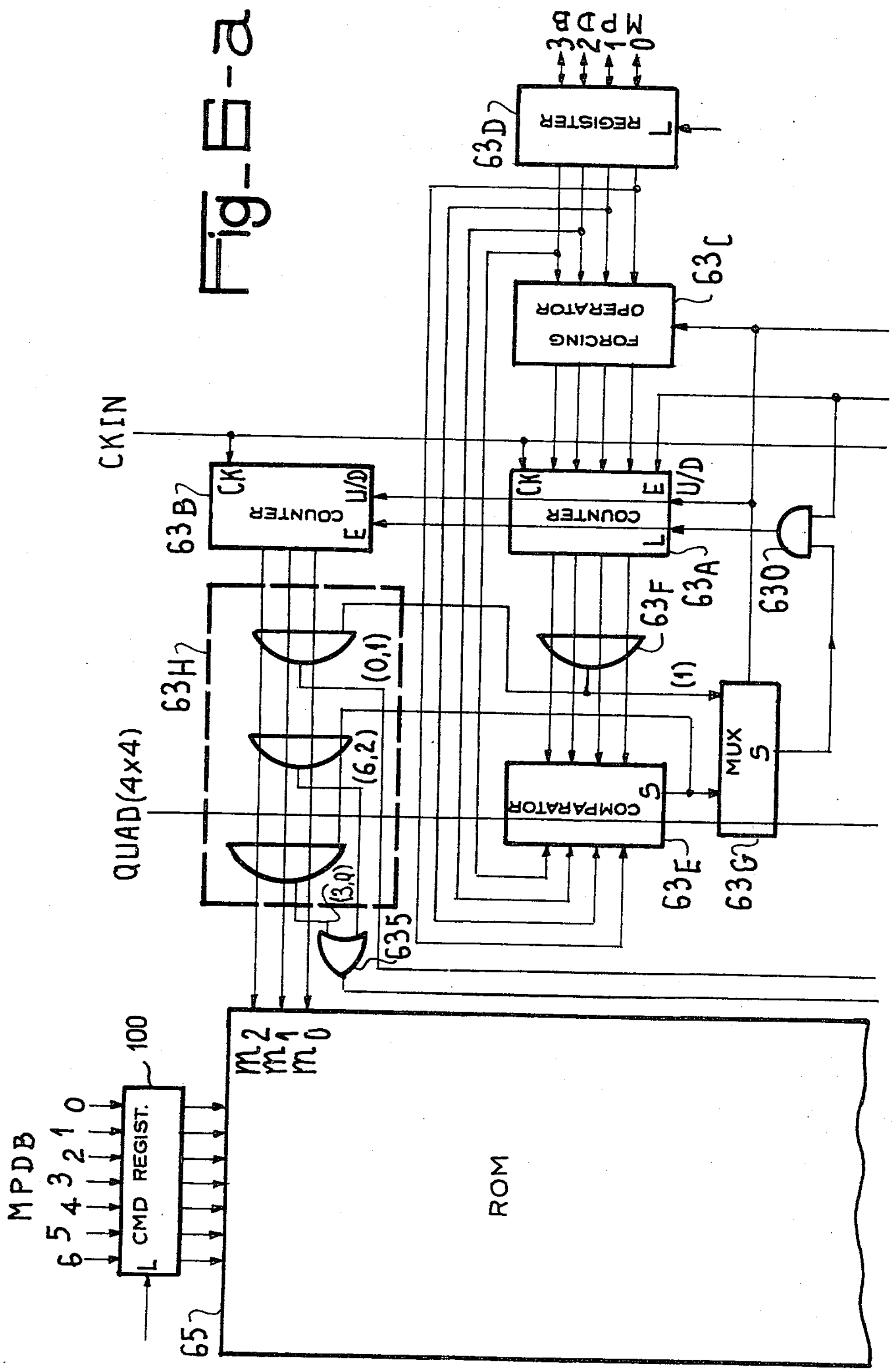
MPDB
3 2 1 0
REGISTER
L
63D
FORCING OPERATOR
63C
CKIN
CK
COUNTER
U/D
E
63B
L
63A
63F
630
(1)
MUX
S
63G
COMPARATOR
S
63E
63H
QUAD(4x4)
(0,1)
(6,2)
(3,0)
635
100
MPDB
6 5 4 3 2 1 0
CMD REGIST.
m2
m1
m0
ROM
65

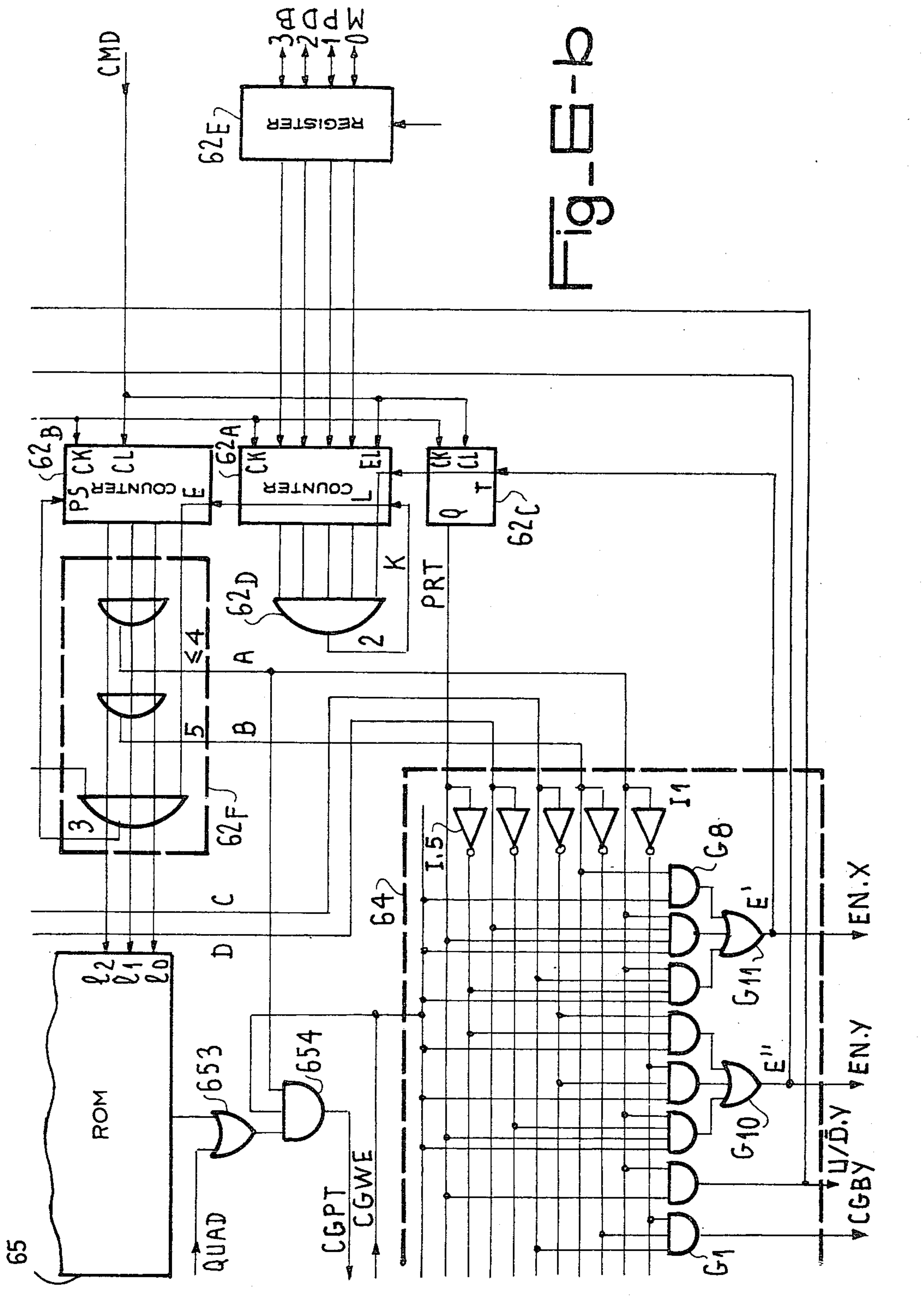
Fig-6-b
CMD
REGISTER
62E
3 B
2 D
1 P
0 M
COUNTER
62B
62A
62C
62D
62F
PRT
K
A
B
C
D
≤4
5
3
2
ROM
65
ℓ2
ℓ1
ℓ0
653
654
QUAD
CGPT
CGWE
64
I.5
I1
G8
G11
G10
G1
E'
E''
EN.X
EN.Y
U/D.Y
CGBY

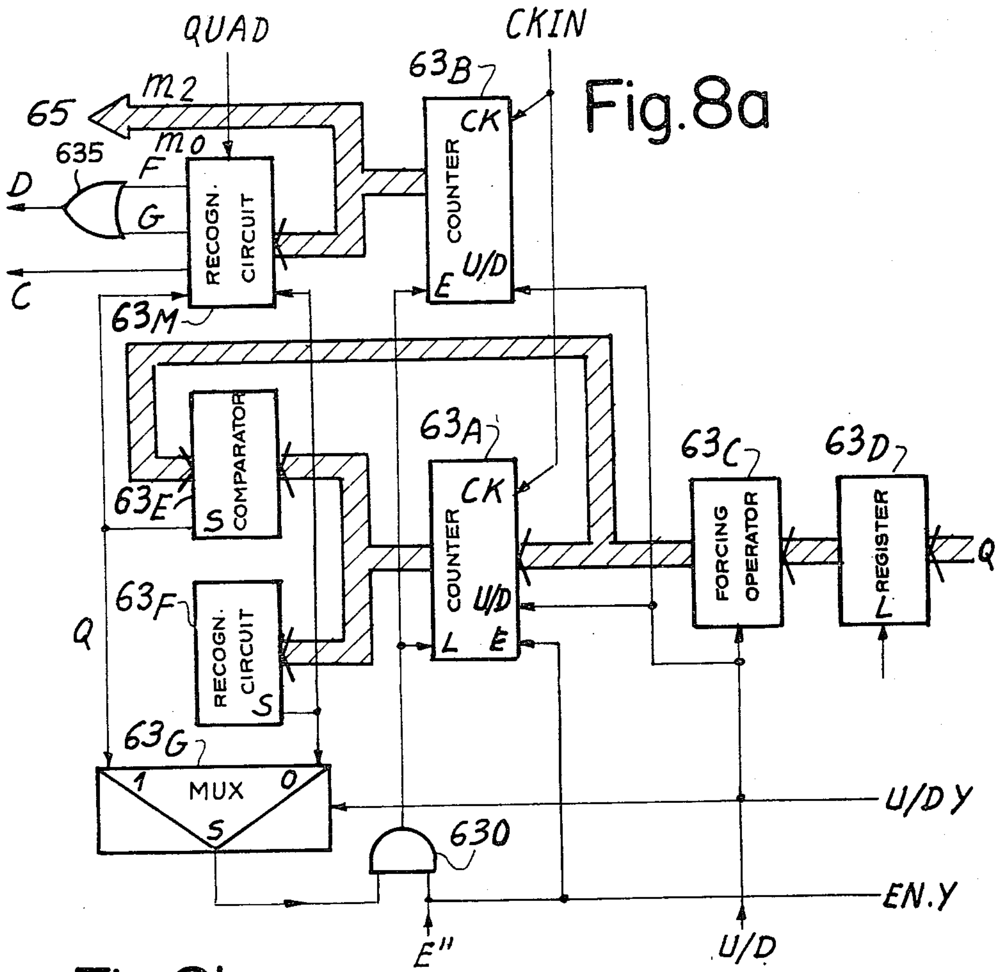
Fig.8a
Fig.8b
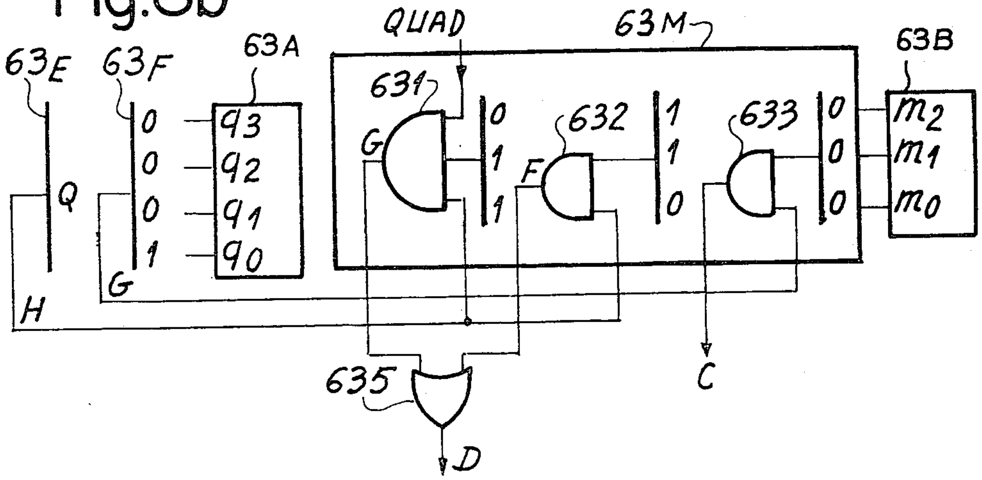

FIG_10-a
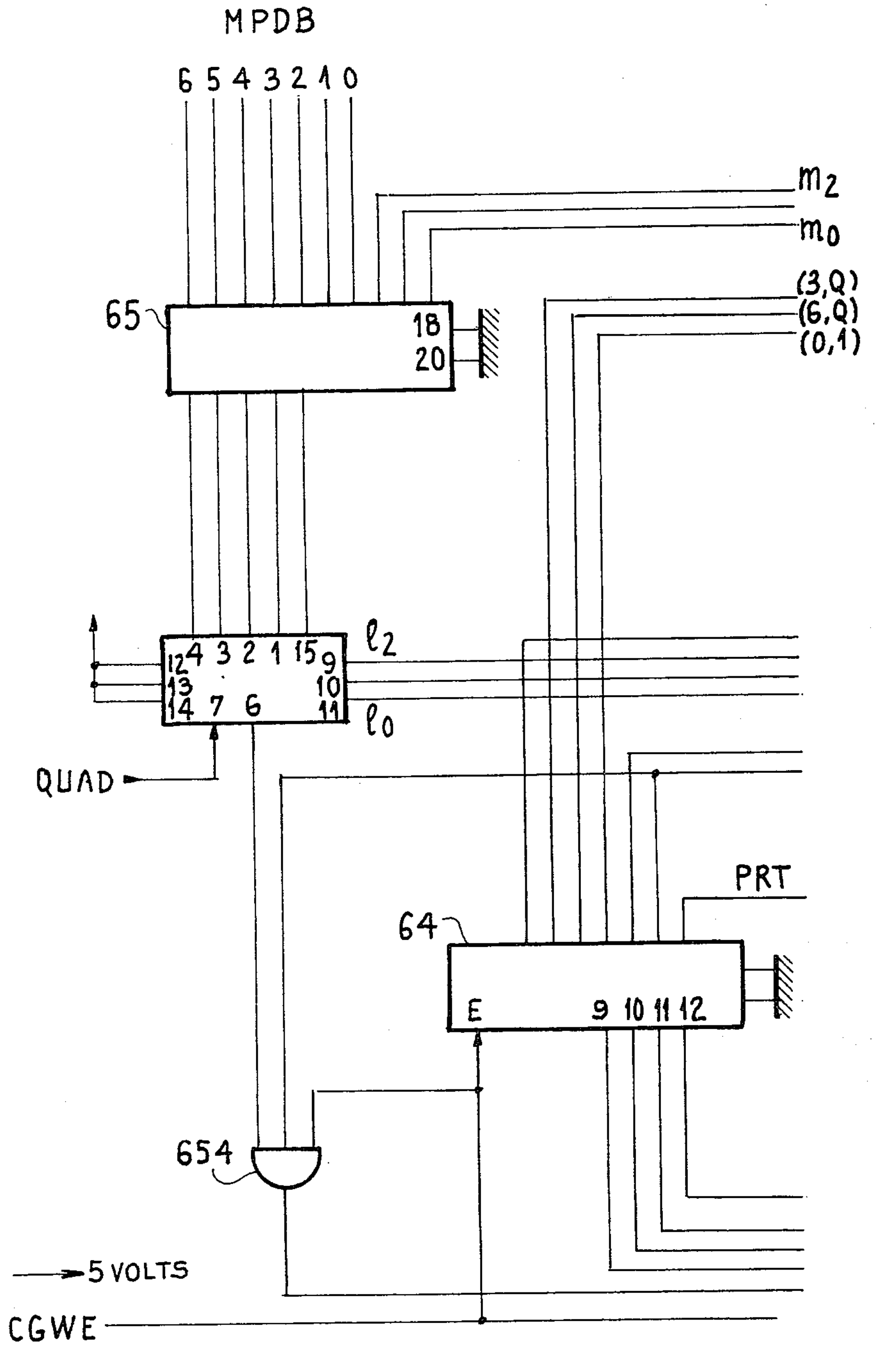

FIG_10-b
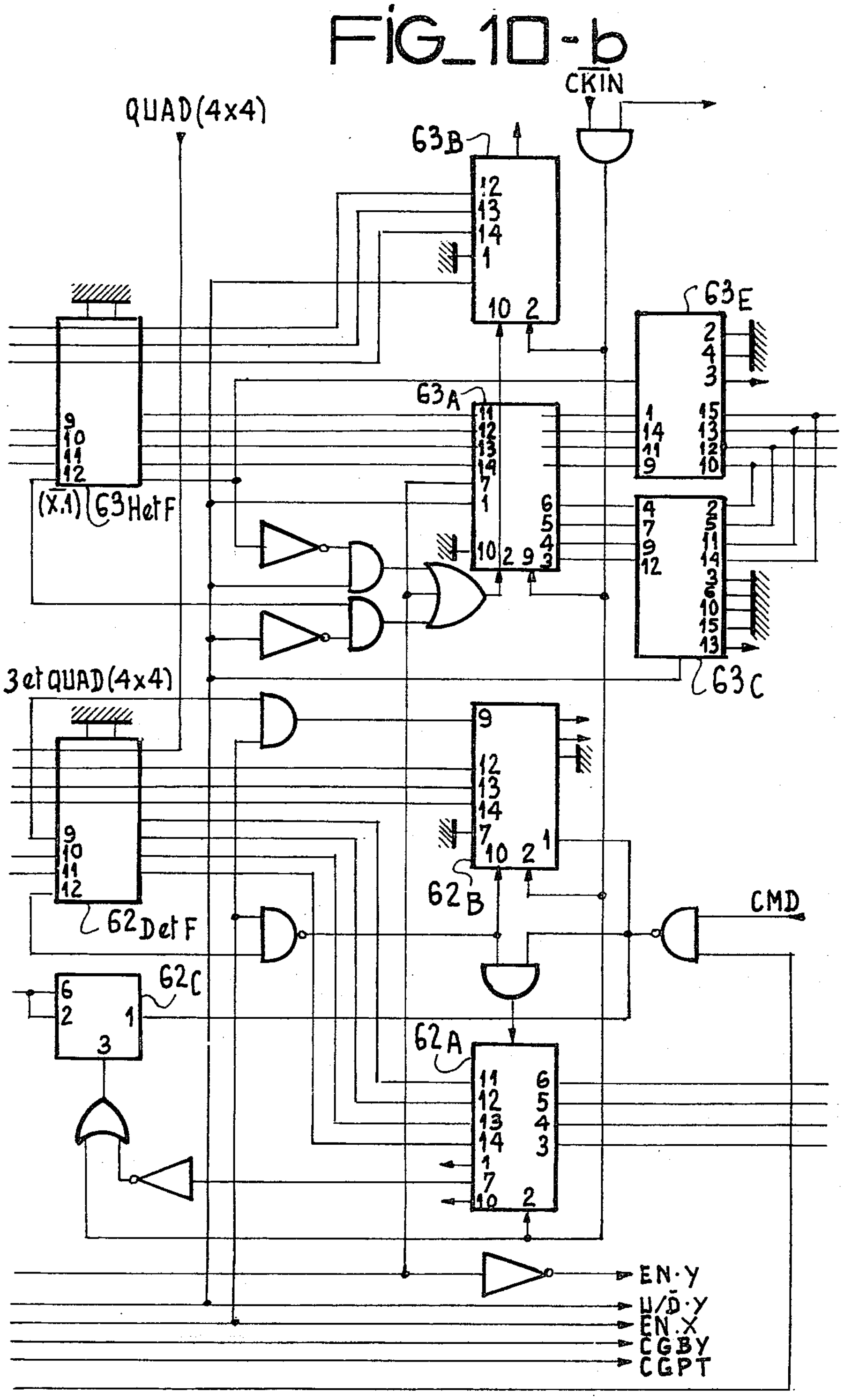

FIG_10-C
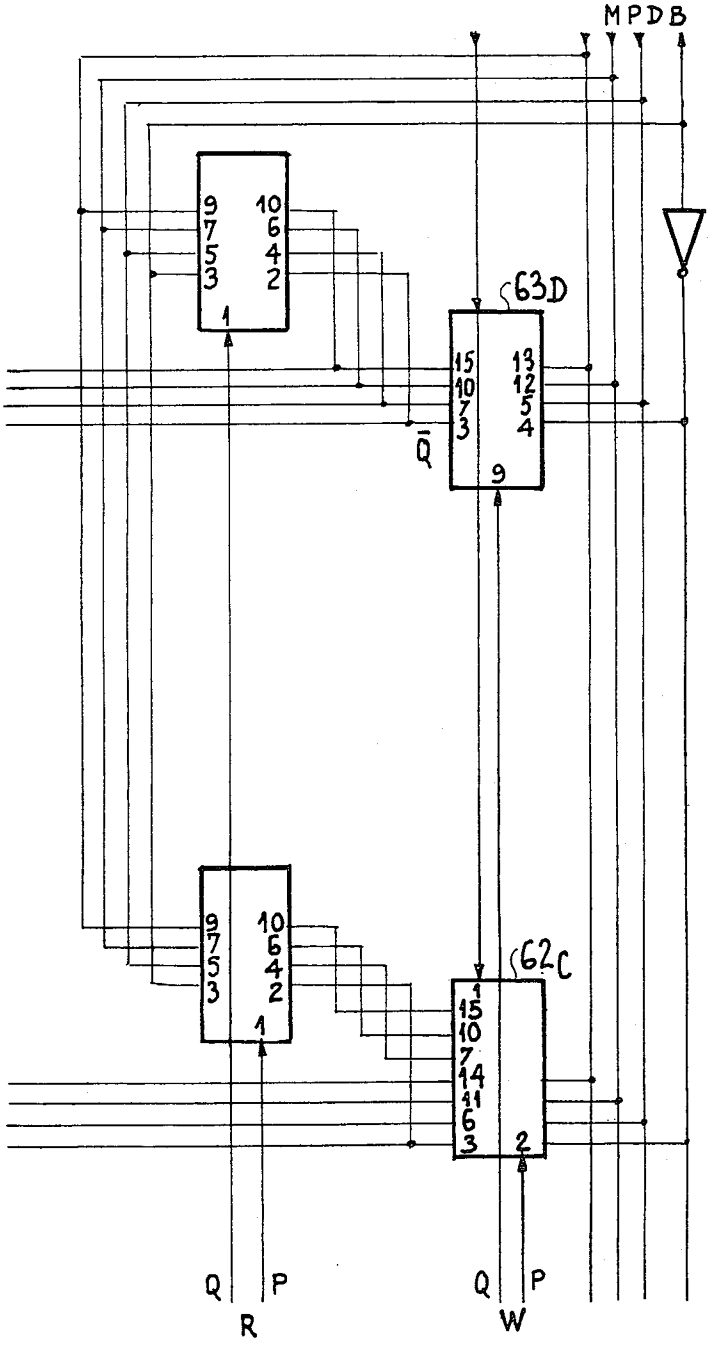

SYMBOL GENERATOR FOR A GRAPHIC CONSOLE

This invention relates to the technical field of graphic terminals. More precisely, the invention relates to a graphic function generator and, more particularly, to a generator for drawing graphic symbols.

Information systems which enable graphic images composed of geometric figures, alphanumeric characters and various signs to be displayed on the screen of a console are known in the art as graphic terminals. Various types of console may be envisaged according to the nature of the light screen: e.g. cathode ray tube (CRT) consoles, consoles equipped with a liquid crystal panel (LCP), consoles equipped with a matrix of electroluminescent diodes and, plasma panel consoles. Although still in the development stage, these last three types may be envisaged when the definition (number of dots per image) of the image to be displayed is not very high. Graphic consoles of the high definition type (greater than 250×250 dots) use cathode ray tubes. The graphic consoles may be divided into two classes according to the nature of the cathode ray tube: one of these classes includes consoles equipped with a cathode ray tube of which the cathode screen has an intrinsic memory and on which the data of the image are recorded and erased as required; the other class includes consoles equipped with a cathode ray tube of which the cathode screen has a very low persistence so that it is necessary to add an erasable image memory where the data of the image are stored and may be read repetitively in order to refresh the displayed image. The book by M. MORVAN et al, entitled "Images et Ordinateurs", published by Larousse, Paris 1976, may be usefully consulted on this subject.

A graphic function generator is a wired system which is intended to draw graphic images on a sensitive support. In general, it comprises various generators, namely: an alphanumeric character or, more generally, symbol generator; a vector generator and, optionally, a circle generator. The graphic images are produced in the form of a series of dots which may be recorded and then erased either completely or selectively. The sensitive support may be formed by the screen of a cathode ray storage tube, a photosensitive film, a magnetic or electrical memory unit, etc.

Under the action of a control instruction, a symbol generator has to:

produce the image data corresponding to a symbol specified by a data word, store these image data on an optionally erasable support at an address determined by a data word or by the previously recorded symbol, subsequently erase all or some of the previously stored symbols under the action of an instruction.

The generator has to enable each of the symbols to be written very rapidly, above all if the graphic image displayed is animated. In addition, it is desirable to be able to modify the size (dimensions) of the symbols.

Symbol generators enabling alphanumeric characters to be generated in the form of a series of discrete dots are known in the art. One such character generator is described in Applicant's French patent application No. 77.05254 relating to "A Processor for an Information Terminal using a Television Receiver". Known character generators are either limited in terms of speed or are complex where they are capable of modifying the size of the characters. In addition, they do not afford all the possibilities required of an interactive terminal.

The object of the present invention is to obviate the disadvantages referred to above and, in particular, to provide a compact symbol generator which may be produced in the form of or as part of a large scale integrated circuit (LSI circuit) or even by assembling commercially available medium scale integrated circuits (MSI circuits).

Accordingly, the invention relates to a method and an arrangement for drawing graphic symbols composed of alphanumeric characters, various symbols and particular figures, such as quadrilaterals which are referred to hereinafter in short as "QUAD's".

In addition, means are provided for modifying the format $l \times m$ of the symbols, l and m being respectively the width and the height of the format.

According to one aspect of the invention, the size of the symbols may be modified as required by program.

According to another aspect of the invention, the symbols are drawn in such a way as to reduce the drawing time and to minimize the complexity of the writing circuits.

The method according to the invention comprises:

forming a grid of $l \cdot P \times m \cdot Q$ dots composed of a matrix of l columns each comprising m spaces, each space comprising $P \cdot Q$ dots, the method being characterised in that this grid of dots is formed by creating adjacent columns of $m \cdot Q$ dots following a so-called "pedestal" path;

reading in a character memory the memory dots representing a selected character at the addresses created by the matrix $l \times m$, simultaneously drawing all the dots of the grid on a sensitive support, recording the content of the character memory on this support.

According to another aspect of the invention, the drawing of a symbol may be interrupted and resumed at any time.

According to another aspect of the invention, an already recorded symbol may be erased by forming a grid of $l \cdot P \times m \cdot Q$ dots and forcing the output of the character memory to the "black" level.

According to another aspect of the invention, a grid of $l \cdot P \times m \cdot Q$ dots is formed and the output of the memory is forced to the "white" level for drawing QUAD's. According to this same aspect of the invention, the output of the character memory is forced to the "black" level, in addition to which the values of the parameters m and l may be independently modified.

The symbol generator according to the invention comprises:

a two-way data bus connected to an external control element, a programmable writing unit which enables a grid of $l \cdot P \times m \cdot Q$ dots to be formed, this unit being connected to the data bus and to a timing clock, a read-only memory in which the alphanumeric characters to be generated are stored in the form of memory dots, this memory being connected to the data bus and to the writing unit, a writing pointer enabling a given symbol to be drawn on a sensitive support, this pointer being connected to the data bus and to the writing unit.

The writing unit comprises means for forming $l \cdot P$ columns and a logic writing means so that the dot grid is recorded along a "Grecian" path.

Other features and advantages afforded by the invention will become apparent from the following description which, in conjunction with the accompanying drawings, describes purely by way of example one embodiment of the invention.

In the drawings:

FIG. 1 shows in a modular form the elements which make up a graphic TV console, namely the TV set and its image memory, the control signal generator and a graphic function generator.

FIGS. 2*a*, 2*b*, 2*c*, and 2*d*, shows how a symbol is represented and written in the form of a grid of dots.

FIG. 3 is a modular diagram of the symbol generator showing its three main parts, namely a writing unit, a read-only character memory and a writing pointer.

Figure 4A:
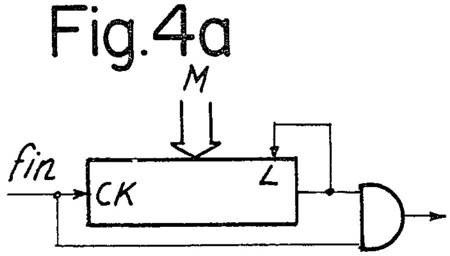
Figure 4B:
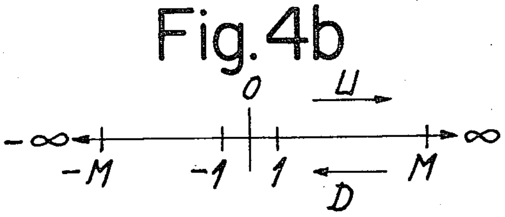

FIGS. 4*a*, 4*b* diagrammatically illustrate a modulo M counter and the corresponding counting diagram.

Figure 5A:
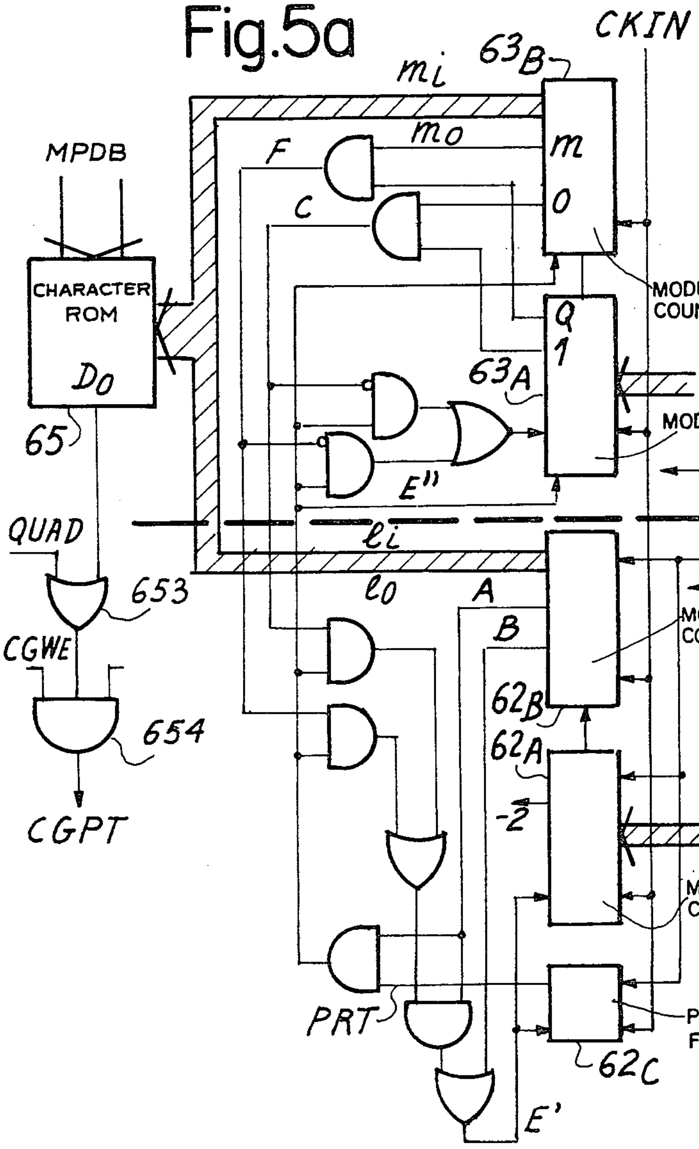
Figure 5B:
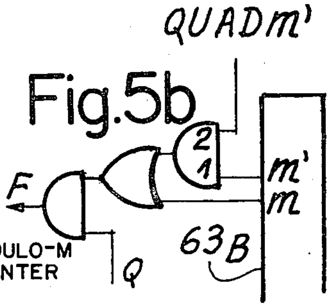
Figure 5C:
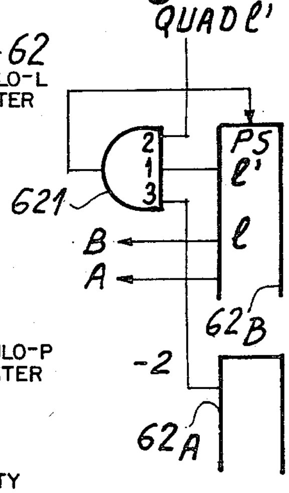

FIGS. 5*a*, 5*b* and 5*c* show in a synoptic form the architecture of the counters of the writing unit and the means for modifying the format of the dot grid.

FIGS. 6*a* and 6*b* are a logic diagram of one embodiment of the graphic symbol generator as a whole.

Figure 7:
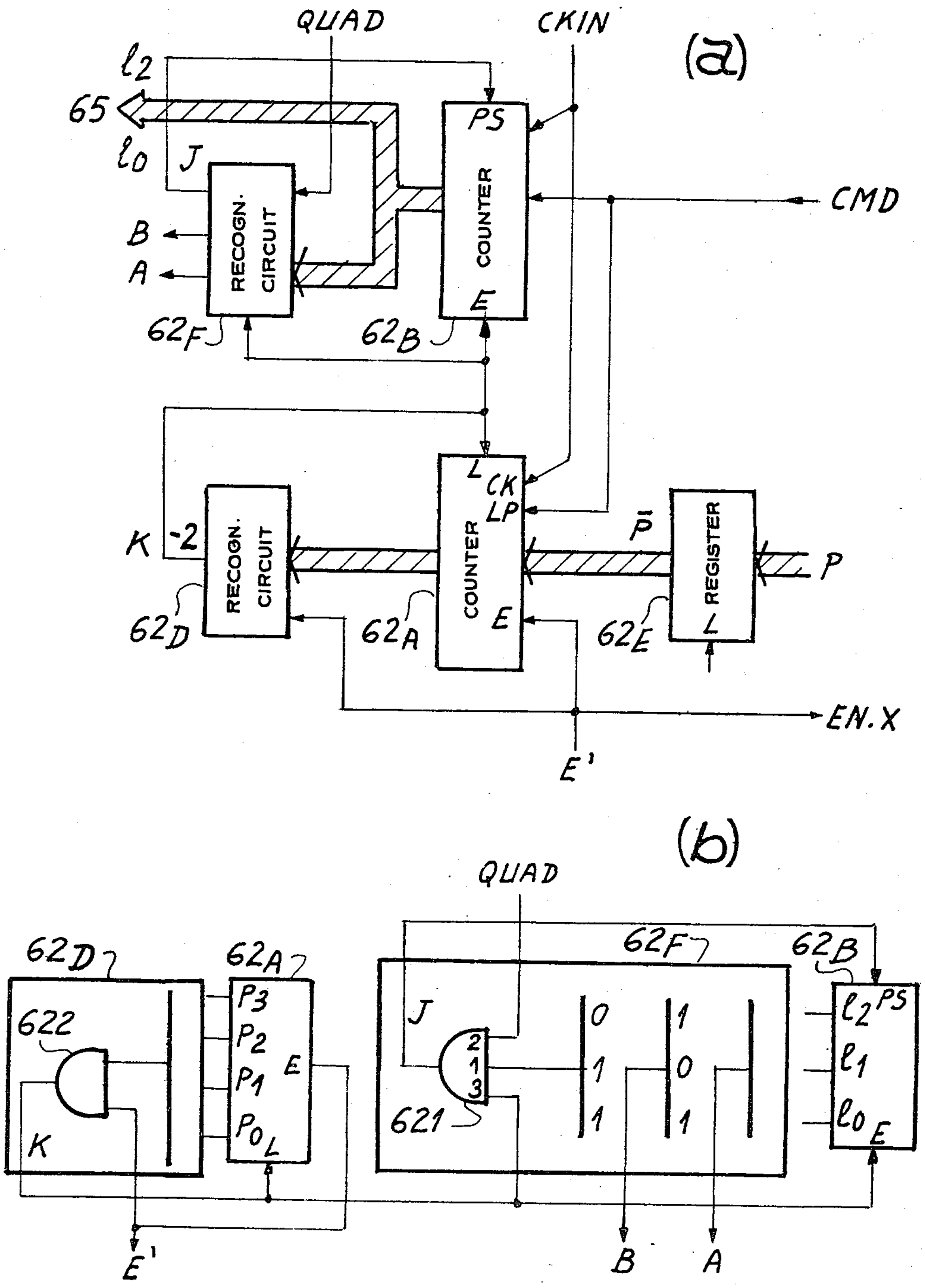

FIGS. 7*a* and 7*b* show one embodiment of the means for forming the columns of the dot grid and the details of the associated state recognition circuits.

FIGS. 8*a*, 8*b* show one embodiment of the means for forming the dots of a column of the dot grid and the details of the associated state recognition circuit.

Figure 9:
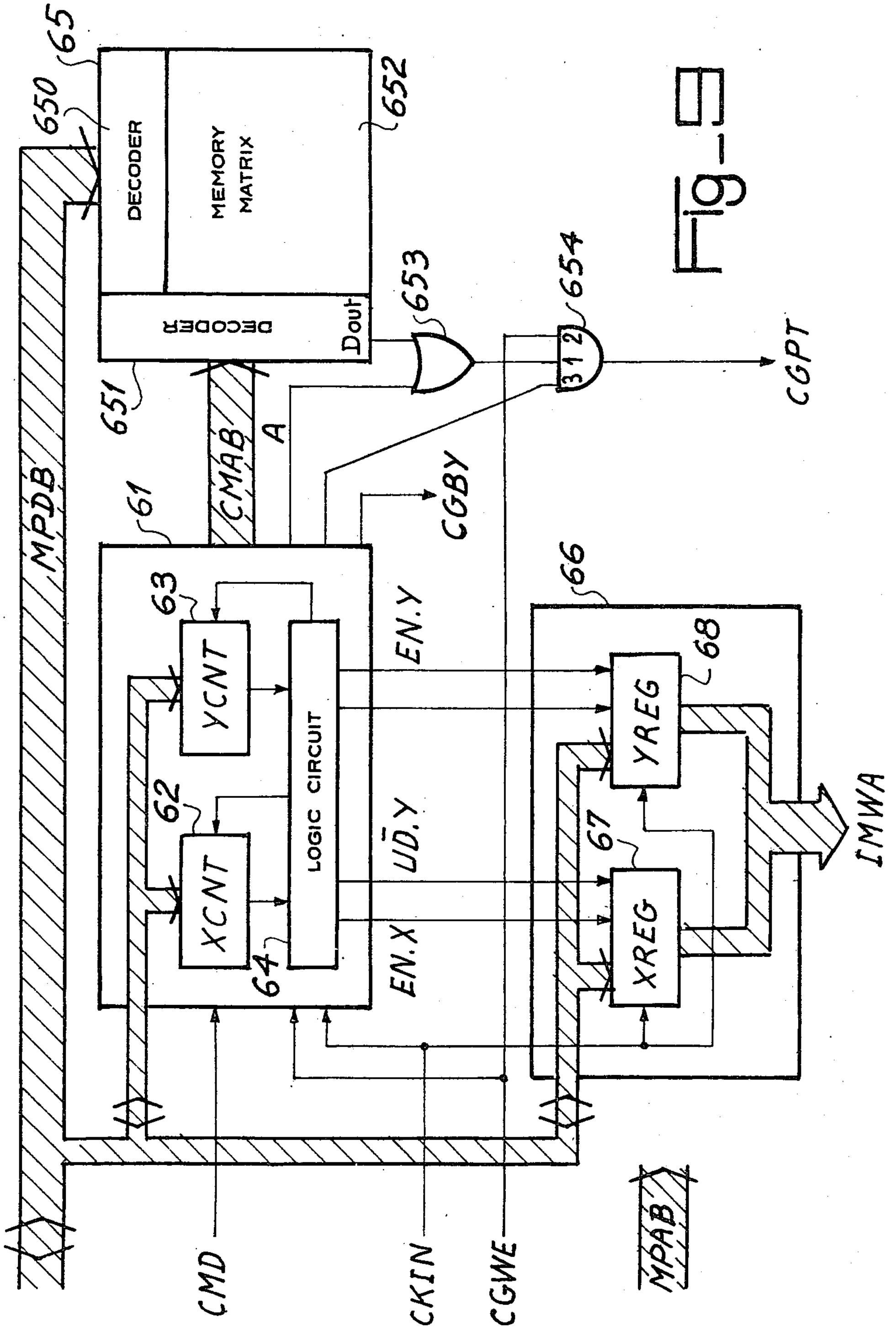

FIG. 9 shows the connections between the symbol generator and the external elements.

FIGS. 10*a*, 10*b* and 10*c* show an embodiment of the symbol generator based on MSI modules.

Table 1 shows the ASCII code of the various symbols.

In the following description of the invention, a symbol generator is described in its application to a graphic console equipped with a low-persistence cathode ray tube which requires the presence of an image memory in which the symbols have to be stored to enable the image displayed on the screen of the cathode ray tube to be refreshed repetitively. Numerous specific details of the character generator, such as the counters, the registers and the instruction decoders have not been described because these elements are known in the art and would complicate the description and obscure the novel features of the invention. Equally, however, it will be understood that numerous specific details have been included in the description in order to explain the new features of the generator and that they are not specifically necessary for carrying out the invention as described.

FIG. 1 shows in a modular form the principal elements for forming a graphic display console. This console comprises in particular the following conventional elements:

a television (TV) set 10 which, at its input, receives a composite video signal (VC), optionally modulated by a radio-frequency carrier wave. This TV set comprises a cathode ray tube (CRT) 11 of the monochrome or colour type; an amplifier/modulator 12 which delivers to the cathode ray tube the video signal and, via pulse separators, the line and frame synchronising signals of the TV scan; these signals are delivered to a circuit 13 which produces the signals for deflecting the electron beam;

a signal generator 20 which produces a signal SYNC for synchronising the TV scan; reading address signals (IMRA) and control signals CMD associated with an image memory 30;

an image memory 30 formed by a block of random access memory (RAM) modules (packages) which may advantageously be of the dynamic type; this memory is used for storing the data of the image to be displayed; it may be written or erased and read by addressing its lines and its columns and by enabling its control inputs;

a video mixer 40 which is an optional element if the TV set is a monitor equipped with an SYNC input and a video input. It enables the video signal V supplied by the output of the image memory to be mixed with the signal SYNC supplied by the signal generator 20;

a symbol generator 60 for forming series of dots which are representative of the symbol to be written in the image memory 30; it delivers to the image memory writing address signals IMWA and control signals CS; from an external unit for example a microprocessor MPU (not shown), it receives data and control signals and, from the signal generator 20, a writing enable signal WE and a clock signal CLK.

The other elements, such as the dialogue tools (light pen, randle, rolling ball) do not form any part of the invention and, for this reason, will not be described. The signal generator 20 may be of a known type and, in particular, a signal generator of the type described in Applicant's French Patent Application filed on the same data under the title "A Signal Generator for a Graphic Console".

In brief, the graphic display system which has just been described functions in two modes, namely: a writing mode in which the symbol generator 60 generates predetermined symbols and, at the same time, writes them in the form of memory dots in the image memory 30, and a reading/display mode in which the signal generator 20 reads the content of the image memory and produces a video signal which is delivered to the TV set.

FIG. 2 shows how the displayed symbols are represented.

FIG. 2*a* shows a matrix of $l \times m$ spaces where l and m are respectively the number of columns identified from 0 to 4 and the number of rows identified from 0 to 6.

The origin of the space matrix is determined by the values $X_i$, $Y_i$ which belong to the displayed graphic image, X and Y respectively representing the abscissa and the ordinate of the original image $X_o$, $Y_o$. In order to illustrate FIG. 2*a*, a particular symbol (letter A) has been drawn. The symbol generator also enables particular figures to be drawn, for example a rectangle of dimensions $l \times m$ which is particularly useful for erasing a previously recorded character; and even a smaller rectangle of dimensions $l' \times m'$. It will be noted that the parameters l' and m' may be made identical which enables figures such as "checker boards" to be drawn. The spacing between two consecutive characters may be equivalent to one column or more where a "space" instruction available on a keyboard or generated by a control unit is issued.

The size (dimensions) of the recorded symbols may be modified by two scale factors P and Q applied respectively along the abscissa and the ordinate of the space matrix. To this end, each square of the matrix $l \times m$ forms a sub-matrix of $P \times Q$ dots, as shown in FIG. 2*b*. The scale factors P and Q may be modified independently, for example $$1 < P \leqq 16 \text{ and } 1 > Q < 16$$

The matrix L×m and the sub-matrixes P×Q form a grid of l·P×m·Q dots.

A given symbol may be drawn in different ways according to the path or course of the grid of l·P×mQ dots. The path may follow a "zig-zag" course in the same way as a television scan. This means that dots already traversed have to be traversed again, resulting in a reduction in the writing speed, in addition to which up/down counters (also known as direct/inverse counters) have to be used.

A different path is the so-called "pedestal" path where the grid successively covers all the points l·Q of one column in a given direction and then the points l·Q of the adjacent column in the opposite direction, as shown in FIG. 2*c*. Other paths may be considered, for example a pedestal path in the form of rows or even a rectangular spiral. For the purposes of the following description, the path selected will be a pedestal path in the form of columns which requires only a single up/-down counter, the path beginning at $X_i$, $Y_i$ (sign D) and finishing at the point A: $(X_i+(l+1)\ P, Y_i)$; in the example selected, the path finishes at the point A corresponding to $X_i+6P$. It can be seen from FIGS. 2*c* and 2*d* that the path will be different according to the parity of the scale factor P. The direction in which the dots of a column are counted will always be able to be identified if the parity of the successive dot columns is detected.

FIG. 3 shows in a modular form a symbol generator according to the invention and the principal connections on the one hand with the elements forming the graphic console and, on the other hand, with a control unit, for example a microprocessor (MPU) which is not shown in FIG. 3.

The symbol generator 60 comprises the following elements:

a writing unit 60 comprising a signal generator 61 connected to a logic means 64 for controlling the operation of the generator, a read-only character memory (ROM) 65 comprising a decoder 650 for the code word corresponding to the symbol to be drawn, a decoder 651 for the reading addresses, a memory dot matrix 652 in which alphanumeric characters and the usual symbols are recorded. This memory delivers a writing signal CGPT, a writing pointer 66 comprising two registers, namely an X register 67 and a Y register 68. These registers may be loaded to the respective values $X_i$ and $Y_i$ and may be incremented by the writing unit 60.

The following elements are also shown in the Figure:

an image memory 30 which comprises in particular an RAM memory element 31 and a multiplexer 33 for addressing the memory either in the reading mode or in the writing mode under the action of the writing enable signal CGWE; in the reading mode, the memory 31 delivers a signal VIDEO representative of all the symbols drawn in this memory.

The principal connections of the symbol generator to the other elements are as follows:

The symbol generator receives from the signal generator 20:

a clock signal CLK referred to hereinafter as the signal CKIN, a writing enable signal CGWE.

The symbol generator receives from the control unit MPU:

on a two-way data bus MPDB words corresponding to instructions, commands, data, such as the code of the character to be drawn, on an address bus MPAB the words corresponding to the addresses of the registers in which the data words are to be stored or read, a signal $MPR/\overline{W}$ which corresponds to a writing or reading instruction of the registers.

The reading words may be transferred to the unit MPU by the two-way bus MPDB.

The symbol generator delivers to the image memory 30:

a signal CGPT corresponding to the character dots effectively stored in the ROM 65, on an address bus IMWA, the writing address signals delivered by the writing pointer 67.

The symbol generator uses two types of modulo M counters, namely up counters and up/down counters. The basic diagram of an N-bit modulo M counter ($M \leq 2^N$) is shown in FIG. 4*a*. It enables the frequency $f_{in}$ of an input signal to be divided by a factor M, the linking of a modulo P counter and a modulo Q counter enabling the frequency of the input signal to be divided by a factor P·Q. FIG. 4*b* shows a diagram indicating the various existing counting possibilities:

Up counting:

(a) recognising the state M of the counter and loading it to the value 1, (b) recognising the state −1 of the counter and loading it to value −M.

Down counting:

(c) recognising the state 1 of the counter and loading to the value M, (d) recognising the state M of the counter and loading it to the value −1.

Instead of selecting the values (−M and −1), it is possible by using the relation $M+\overline{M}=2^N-1$ to select the values $\overline{M}$ and −2. It is also possible to use an up/-down counter connected to recognition circuits for recognising the states 1 and M and to load this counter to the values M and 1, respectively.

FIG. 5*a* shows in a simplified diagrammatic form the means according to the invention for generating alphanumeric characters such as those shown in Table I corresponding to the ASCII code.

The grid of l·P×m·Q dots is generated by synchronous counters which can be incremented by the clock signal CKIN; these synchronous counters may be conceptionally divided into two parts:

the lower part 62 corresponding to the columns of the dot grid, the upper part 63 corresponding to the dots of a column.

The lower part comprises: a parity flip-flop 62C of which the output signal indicates the parity of the columns of the grid, a modulo P up counter 62A of which the output signal validates a modulo l up counter 62B which delivers the reading addresses $(l_o-l_i)$ to a read-only character memory 65.

The upper part comprises: a modulo m up/down counter 63B which supplies the reading addresses (mo−mi) of the read-only memory, and a modulo-Q up/down counter 63A.

On the other hand, the read-only character memory 65 is connected to the data bus MPDB which supplies the code of the character to be drawn. At its output $D_o$, it delivers data signals which are representative of the character selected.

The counter 62B delivers a signal A corresponding to the state ≦l and a signal B corresponding to the state l+1. The counter 63A delivers a signal corresponding to the state Q and a signal corresponding to the state "1". The counter 63B delivers a signal corresponding to the state O and a signal corresponding to the state m. The parity flip-flop 62C delivers a signal PRT in the low state. When the parity of the column of dots to be drawn is even, this signal permits the counting direction of the counters 63*a* and 63*b* to be controlled.

Logic means enable the following signals to be generated: a signal E' for validating the counter 62A and the flip-flop 62C, a signal E" for validating the counter 63A and a counting direction signal Up (up counting) corresponding to the columns of even order. These three signals E', E" and Up have to satisfy the following relations:

$$E' = A.\,[[(C\,\overline{U}_p] + [(F.U_p)]] + B$$

$$E'' = (\overline{C}.\overline{U}_p) + (F.U_p)$$

$$U_p = (\overline{PTR}.A)$$

where as indicated above:

A=≦l; B=(l+1)

C=0.l; F=m, Q

PTR=column of even order.

According to the invention, the format lxm of the matrix of character spaces may be modified. FIG. 5.*b* shows the means for modifying the number of rows m of the matrix. A state m'<m of the counter 63B is recognised and the corresponding signal is applied to a first input of an "AND" gate which, at a second input, receives an instruction QUADm'. The output signal of this gate is applied to a first input of an "OR" gate which, at a second input, receives the signal corresponding to the state m. FIG. 5.C shows the means for modifying the number l of columns of the matrix. A state l'<l of the counter 62B is recognised and the corresponding signal is applied to a first input of a logic "AND" gate (621) which receives on the one hand at a second input an instruction QUAD l' and, on the other hand, at a third input a signal corresponding to the state "−2" of the counter 62A; the output of this AND gate is applied to an input of the counter 62B which enables this counter to be preset to the state (l+2), with the result that drawing of the dot matrix is stopped.

In order to generate a grid of l.Pxm.Q dots, a control pulse CMD enables the flip-flop circuit 62C to be positioned at the lower level, the counter 62A to loaded to the value $\overline{P}$ and the counter 62B to be set to the zero value. After one drawing cycle, the state of the various counters is as follows: The trigger 63 is in a state corresponding to the parity of the last column drawn which depends on the product l.P, the counter 62A is in the state (P), the counter 62B is in the state (l+2), the counter 63A is in the state ("1") state and the counter 63B is in the state (zero).

The rate at which the dot grid is generated and, hence, the time taken to draw a symbol is determined by the rate of the clock signal CKIN. This rate is limited by the electrical performance levels of the electronic circuits forming the generator, above all the read-only character memory. The time taken to draw one dot of the grid may be less than a fraction of a microsecond, the time taken to draw a complete symbol being proportional to the product lP.mQ.

Table 1 shows by way of illustration the ASCII codes of the words which specify the characters and the control signals:

the 95 characters are specified by the code words H "2O" to H "7E" (H=hexadecimal), the control signals are specified by code words placed from H'OO' to H'OF', for example: zeroing the writing pointer; X register H'OD', Y register H'OE'.

FIG. 7*a* shows in a modular form the architecture of that part of the counter 62 which forms the l.P columns of the dot grid. The counter 62A is connected to a register 62E in which the value of the scale factor P is stored by the application of a command to the input L. At its outputs, this register delivers the complemented value $\overline{P}$. The outputs of the counter 62A are connected to a state recognition circuit 62D which enables the state −2 of this counter to be recognised. The counter 62B is linked to the counter 62A. It outputs $l_0$–$l_2$ are connected to a three-stage state recognition circuit 62F which enables the following states to be recognised: ≦4, 5 and 3.

FIG. 7*b* shows in the form of a synoptic diagram the details of the state recognition circuits 62D and 62F. The output of the stage of the recognition circuit 62F, which recognises the state 3, is connected to a first input of a logic "AND" gate 621 which, at a second input, receives the control signal QUAD and, at a third input, the state −2 of the counter 62A.

FIG. 8*a* shows in a modular form the architecture of the counter 63 for generating the m.Q dots of a column of the dot grid. The inputs of the counter 63A are connected to the outputs of an operator 63C which enables these outputs to be forced to a state "ONE" $(0001)_2$. The inputs of the operator 63C are connected to the inputs of a register 63D which enables the value of the scale factor Q to be stored through a loading input L. The outputs of the counter 63A are connected on the one hand to a comparator 63E which enables the state Q of this counter to be detected and, on the other hand, to a recognition circuit 63F which enables the state 1 to be detected. The output S of the comparator and of the recognition circuit are applied to the inputs 1 and 0 of a multiplexer 63G controlled by the signal U/D generated by the above-mentioned logic writing means 64. The output S of this multiplexer is applied to a first input of an "AND" gate 630 of which the second input receives the validation signal E". The output of the gate 630 enables the counter 63A to be loaded to the value 1 when the counting direction is U (up) and inversely to the value Q when the counting direction is D (down). The forcing operator 63C is forced to the state "ONE" when the counting direction is U (up). The outputs $m_0-m_2$ of the counter 63B are connected to a state recognition circuit 63H comprising three stages which enable the states 0, 6 and 3 of this counter to be recognised.

FIG. 8*b* shows in the form a synoptic diagram the structural details of the recognition circuits 63F and 63H. The output of the stage of the recognition circuit 62H which recognises the state 3 is connected to a first input of a logic "AND" gate 63 which, at a second input, receives the control signal QUADm' and, at a third input, a signal corresponding to the state Q of the counter 63A.

FIG. 9 shows in a diagrammatic form the connections with the external elements, namely:

a two-way eight-bit data bus MPDB which supplies:

the signals specifying the character codes to the seven-bit read-only character memory 65, the signals specifying the value of the scale factors P and Q to the registers P and Q of the counters 62A and 63A, the signals specifying the values $X_i$ and $Y_i$ to the X and Y registers of the writing pointer 66, the zeroing signal for the writing pointer, the zeroing signals for the X and Y registers of the writing pointer, the signal CMP for releasing the writing unit 61, the control signal QUAD (7×5), the signal QUAD (4×4)

a four-bit address bus MPAB which supplies in particular the addresses of the following registers:

X register and Y register of the writing pointer 66

P register and Q register of the counters 62 and 63 a clock signal CKIN, a signal CGWE which enables the operation of the symbol generator.

The generator delivers the following signals:

on a bus IMWA the writing address signals to an image memory or to a sensitive support, a signal CGBY indicating busy state of the generator, a dot writing signal CGPT.

The signal CGPT is generated from the output signal of the read-only character memory which is connected to a first input of an "OR" gate 653 which, at its second input, receives a control signal corresponding to an instruction QUAD (7×5). The output of this gate 653 is connected to the first input of an "AND" gate which, at a second input, receives the signal CGWE and, at a third input, the signal A corresponding to the state $l \leq 4$ of the counter 62B. The signals for incrementing the synchronous registers 67 and 68, which form the writing pointer incrementable by the signal CKIN, are the signals EN/X and EN/Y generated by the logic means 64; the signal which specifies the counting direction of the register 68 is the signal U/$\overline{D}$.Y. On the other hand, an "erasing" signal and a "marking" signal are available, enabling an already recorded character to be erased when the signal QUAD (7×5) is at the upper level.

FIG. 6 shows the complete logic diagram of a symbol generator. The logic means 64, which enables the signals E′, E″ and U/$\overline{D}$.Y for controling the counters to be generated from the state of the counters 62A, B and C and 63A and B, is formed by inverters $I_1$ to $I_5$, logic gates of the "AND" type $G_1$ to $G_8$ and logic gates of the "OR" type $G_{10}$ and $G_{11}$.

The read-only character memory 65 receives the seven-bit character code words through a control register 100 CMD.REGIST. of which the inputs are connected to the data bus MPDB. This register comprises in particular a loading input L which receives a signal derived from the address bus MPAB. The registers 62C and 63D which enable the values of the scale factors P and Q, respectively, to be recorded are connected to the data bus MPDB and, at their input L, receive a loading signal derived from the signals available on the address bus MPAB. It will be recalled that, in the reading mode, these registers 62C and 63D are accessible through the control unit MPU.

The signal CGWE, which authorises the drawing of a graphic symbol, is applied to the input of the logic means 64 and enables drawing to be interrupted and resumed at any time. In addition, this signal CGWE is applied to an input of the gate 654 for validating the output signals of the read-only memory 65. The logic means 64 supplies a signal CGBY indicating busy state of the graphic symbol generator so that, if necessary, an interruption signal is delivered to the control unit MPU.

FIG. 10 shows one embodiment of the graphic symbol generator formed by the assembly of commercially available MSI (medium scale integrated) circuits and SSI (small scale integrated) circuits.

The counters 62A and 62B are LS 163 modules; the counters 63A and 63B are LS 169 modules; the parity flip-flop 62C is an LS 74 module; the recognition circuits 63D and 63F are combined in an SFC 71310 module; the recognition circuits 63H and 63F are combined in an SFC 71301 module; the forcing operator 63C is formed by an LS 157 module; the comparator 63E is an LS 85 module; the read-only character memory is a 3608 module associated with an LS 151 module; the registers 62C and 63D are LS 175 modules. In addition, the Figure shows three-state barriers formed by DM 8097 modules which enable the register 62C and 63D to be read. The additional elements, such as the logic gates and the inverters, are formed by SSI modules.

In addition to the advantages already mentioned, the invention as described in the foregoing has the advantage that it can be produced by an MOS (metal oxide semi-conductor) technique with very large scale integration (VLSI) and the further advantage of enabling a dot grid of variable format to be produced.

The invention is by no means limited to the described embodiment and may comprise other variants. In particular, the values of the parameters l, m, P and Q may be modified, the number of symbols generated may be increased or reduced by changing the dimensions of the read-only character memory and the shape of the graphic symbols may be modified by differently programming the read-only character memory.

The invention may be used in numerous symbol display and writing systems and, in particular, in graphic consoles using a cathode ray storage tube, graphic X.Y plotters, plasma screens etc. . . . in systems for recognizing image forms or for spatially filtering an image.

I claim:

1. A symbol generator for tracing, on a sensitive medium, alphanumeric characters and the like, said characters being formed on a grid comprising l.P adjacent columns, each column comprising m.Q points, said generator comprising:

(a) first and second input busses, each connectable to an external control means (MPU), said first bus comprising a data channel (MPDB) and said second bus comprising an address channel (MPAB);

(b) means for supplying a clock signal (CKIN) to control the timing of said symbol generator;

(c) a character memory (65), connected to said first and second input busses, said memory having lX m memory calls for each character and further comprising:

1. first and second addressing inputs; and
2. a signal output for driving said sensitive medium;

(d) a writing pointer circuit (66) connected to said first and second input busses, said pointer circuit comprising first (X) and second (Y) up/down counters connected to said clock signal supplying means, each of said counters having first (ENX) and second (ENY) enabling inputs and a command input (U/DY) for setting the counter to count up or count down, the outputs of said up/down counters respectively comprising the X and Y address inputs for the means driving said sensitive medium; and (e) a writing circuit (61), connected to said first and second input busses and to said clock signal supplying means, said writing circuit including means, responsive to the factors P and Q, for programming said writing circuit, said writing circuit having first, second, and third outputs respectively corresponding and connected to the first and second enabling inputs and the command input of said writing pointer circuit, and first and second address outputs respectively corresponding and connected to the first and second addressing inputs of said character memory.

2. The generator according to claim 1 wherein said character is formed on the grid by traversing the l.P columns, of m.Q points each, according to a pedestal trajectory, said generator further comprising:

(f) means for generating the l.P adjacent columns comprising the columns of said grid, said means including:

1. a uni-directional, synchronous counter (62) comprising a modulo-l counter (**62*b*) chained to a modulo-P counter (62*a***);
2. a recognition circuit (62D,F) connected to the outputs of said modulo-l and modulo-P counters for recognizing the state of the outputs thereof; and
3. a parity counter (62C) for generating a count representative of the parity of the columns in said grid.

3. The generator according to claim 2 further comprising:

(g) a register (62E) for storing the value of the factor P, said modulo-P counter including a plurality of inputs each connected to a corresponding output of said P-factor storing register.

4. The generator according to claim 3 wherein said recognition circuit comprises:

(h) at least a recognition logic circuit (62D), connected to the outputs of said modulo-P counter, for recognizing the state-2 in said counter.

5. The generator according to claim 4 wherein said recognition circuit further comprises:

(i) a recognition stage (62F), connected to the outputs of said modulo-l counter, for recognizing the state l'<l said modulo-l counter, said recognition stage further comprising an enabling input (QUAD).

6. The generator according to claim 1 wherein said character is formed on the grid by traversing the l.P columns, of m.Q points each, according to a pedestal trajectory, said generator further comprising:

(j) means for generating the m.Q points in each column of the grid, including:

1. a bi-directional, synchronous counter (63) comprising a modulo-Q counter (**63*a*) chained to a modulo-m counter (63*b***); and
2. a recognition circuit (63E,H) connected to the outputs of said modulo-m and modulo-Q counters for recognizing the state of the outputs thereof.

7. The generator according to claim 6, further comprising:

(k) a register (63D) for storing the value of the factor Q, said modulo-Q counter including a plurality of inputs each connected to a corresponding output of said Q-factor storing register; and (l) means, intermediate said Q-storing register and said modulo-Q counter, for forcing the count in said modulo-Q counter to a particular count.

8. The generator according to claim 6 wherein said recognition circuit comprises:

(m) at least a first and a second recognition stage, connected to the outputs of said modulo-Q counter, for respectively recognizing the states 1 and Q of said modulo-Q counter.

9. The generator according to claim 8 wherein said recognition circuit further comprises:

(n) a third recognition stage (63H), connected to the outputs of said modulo-m counter, for recognizing the state m'<m in said modulo-m counter, said third recognition stage further including an enabling input (QUAD).

10. The generator according to claim 2 wherein said parity counter comprises a trigger circuit of the "T" type.

11. The generator according to claim 2 wherein said uni-directional synchronous counter further comprises:

(o) a reset input for setting said "T" type trigger circuit and said modulo-l counter to the "zero" state and said modulo-P counter to the value "$\overline{P}$."

12. The generator according to claim 5 wherein the output of said modulo-l recognition stage presets said modulo-l counter to the value l+2.

13. The generator according to claim 2 or claim 6, further comprising:

(p) means for generating a first signal for enabling said modulo-P counter, a second signal for enabling said modulo-Q counter, a third signal for enabling said modulo-m counter and a fourth signal for enabling said parity trigger.

14. The generator according to claim 1, further comprising:

(q) means for interrupting the operation of said writing circuit.

15. The generator according to claim 1 further comprising:

(r) means for forcing the signal output of said character memory to a logical "high."

16. The generator according to claim 1 further comprising:

(s) means for forcing the signal output of said character memory to a logical "low."

17. The generator according to claim 1 wherein said character memory comprises a read-only memory (ROM).

18. The generator according to claim 1 wherein said character memory comprises a programmable read-only memory (PROM).

* * * * *